Patented June 28, 1932

1,865,265

UNITED STATES PATENT OFFICE

GEORGE L. MAGOUN, OF NITRO, WEST VIRGINIA, ASSIGNOR TO THE RUBBER SERVICE LABORATORIES COMPANY, OF AKRON, OHIO, A CORPORATION OF OHIO

VULCANIZATION ACCELERATOR

No Drawing.     Application filed May 23, 1931.  Serial No. 539,628.

The present invention relates to the vulcanization of rubber by a new and improved process wherein a new type of rubber vulcanization accelerator is employed. The manufacture and means of employing the preferred new class of rubber vulcanization accelerators are fully set forth hereinafter and will be readily understood from the following description and examples of a preferred mode of carrying out the invention.

The preferred new class of accelerators comprise a reaction product of an amino chlor phosphine and an organic compound containing the grouping —SR, wherein R represents hydrogen, an alkali metal or a salt-forming group. By the term phosphine as employed in the present application is meant a compound containing one phosphorus atom to which are attached three replaceable hydrogen atoms and to which may additionally be attached a divalent non-metallic element. The preferred class of compounds may be incorporated alone in a rubber mix as a rubber vulcanization accelerator; but preferably are employed in conjunction with a basic organic nitrogen-containing accelerating compound as a mixed accelerator. More specifically, however, the preferred class of compounds are employed in conjunction with an amine accelerating compound, for example, diphenylguanidine, as a mixed accelerator.

The following is one example of a preferred method of manufacturing one of the new type of accelerating compounds.

Substantially two molecular proportions of piperidine and substantially one molecular proportion of phosphorus trichloride were dissolved separately in a suitable solvent, for example, benzol, and the former was added slowly to the latter, while keeping the temperature of the mixture at approximately 10 to 15° C. The mixture was agitated for a suitable period of time, in this case approximately one-half to one hour, and then allowed to stand, if desired, for approximately one hour longer at room temperature. The mixture was then filtered and the filtrate added slowly while agitating to substantially two molecular proportions of the sodium salt of mercaptobenzothiazole in the presence of a suitable solvent or mixture of solvents, as for example a mixture of alcohol and benzol. The mixture was then agitated for a short time, for example, approximately one-half to one hour, allowed to stand several hours, if preferred, and filtered from the precipitated salt. The product was then isolated from the filtrate by any convenient method, as for example by evaporating on a water bath. The product may then be washed, if preferred, with a suitable solvent, as for example ethyl ether.

It is believed that the formation of the product set forth is represented by the following equations:

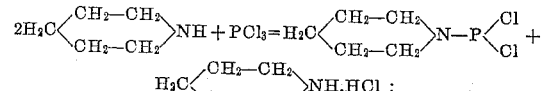

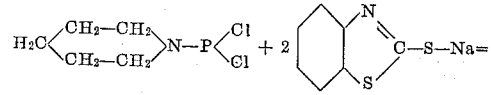

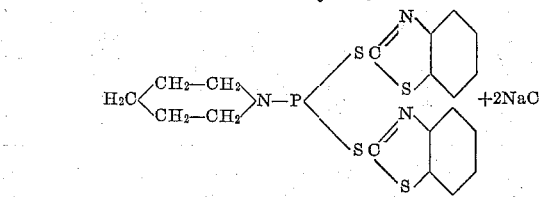

A portion of the material prepared as described above was incorporated in the usual manner in a pure gum rubber stock comprising.

100 parts of pale crepe rubber,
5 parts of zinc oxide,
3 parts of sulfur,
1 part of the reaction product of substantially one molecular proportion of piperidyl dichlor phosphine and substantially two molecular proportions of sodium mercaptobenzothiazole.

The rubber stock thus compounded was then cured in the usual manner by heating in a press for different periods of time at the temperatures given by 10 and 20 pounds of steam pressure per square inch. The vulcanized rubber product on testing was found to possess the following tensile and modulus characteristics:

Table I

| Cure | | Modulus of elasticity in lbs/in² at elongations of | | | Tensile at break in lbs/in² | Ultimate elongation % |
|---|---|---|---|---|---|---|
| Time Mins. | Steam pressure lbs. | 300% | 500% | 700% | | |
| 20 | 10 | 43 | 82 | 168 | 695 | 990 |
| 30 | 10 | 97 | 175 | 487 | 1770 | 940 |
| 30 | 20 | 170 | 348 | 1180 | 2610 | 850 |
| 45 | 20 | 176 | 387 | 1345 | 3370 | 870 |
| 60 | 20 | 211 | 463 | 1573 | 3415 | 850 |
| 90 | 20 | 216 | 477 | 1890 | 3400 | 830 |

The above data show that the reaction product of piperidyl dichlor phosphine and sodium mercaptobenzothiazole, prepared as described above, possesses desirable accelerating properties. This material is, however, preferably employed in conjunction with a basic organic nitrogen-containing accelerating compound, for example, diphenylguanidine, as a mixed accelerator. Thus, a portion of this material was incorporated in a rubber stock comprising

```
100   parts of pale crepe rubber,
  5   parts of zinc oxide,
  3   parts of sulfur,
  0.6 part of diphenylguanidine,
  0.4 part of the reaction product of substantially one mo-
      lecular proportion of piperidyl dichlor phosphine
      and substantially two molecular proportions of so-
      dium mercaptobenzothiazole.
```

The rubber mix was then vulcanized by heating in a press, for the same times and pressures as given in the tests set forth in Table I. The physical characteristics of the rubber stock, after curing, are given in Table II.

Table II

| Cure | | Modulus of elasticity in lbs/in² at elongations of | | | Tensile at break in lbs/in² | Ultimate elongation % |
|---|---|---|---|---|---|---|
| Time Mins. | Steam pressure lbs. | 300% | 500% | 700% | | |
| 20 | 10 | 192 | 405 | 1718 | 4005 | 860 |
| 30 | 10 | 222 | 582 | 2455 | 4270 | 800 |
| 30 | 20 | 333 | 963 | 4055 | 5150 | 750 |
| 45 | 20 | 363 | 1135 | 4435 | 5130 | 740 |
| 60 | 20 | 415 | 1343 | 4840 | 5260 | 735 |
| 90 | 20 | 427 | 1455 | 5145 | 5380 | 730 |

The above results show that the preferred class of vulcanization accelerators possess greatly increased accelerating power when employed as a compounent of a mixed accelerator, for example in conjunction with a basic organic nitrogen-containing accelerator, for example, diphenylguanidine. In this case extremely rapid acceleration was effected and the stock did not fall off in value on long continued heating.

Another example of the preferred class of accelerators comprising the reaction product of piperidyl dichlor sulfophosphine and mercaptobenzothiazole, was prepared by reacting substantially two molecular proportions of piperidine with substantially one molecular proportion of phosphorus sulfochloride and further reacting the product thus formed with substantially two molecular proportions of the sodium salt of mercaptobenzothiazole, in a manner analogous to that described above for the preparation of the reaction product of piperidyl dichlor phosphine and sodium mercaptobenzothiazole, except that the reaction between piperidine and phosphorus sulfochloride was carried out at room temperature.

It is believed that the preparation of this product is represented by the following chemical equations:

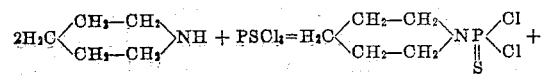

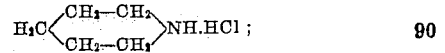

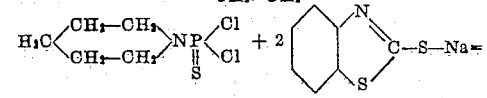

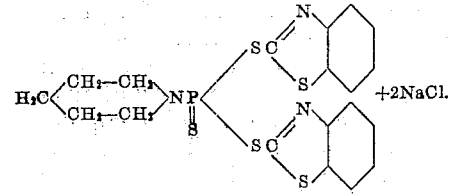

A portion of the accelerator described above was compounded in the usual manner in a pure gum stock comprising

```
100 parts of pale crepe rubber,
  5 parts of zinc oxide,
  3 parts of sulfur,
  1 part of the reaction product of substantially one mo-
    lecular proportion of piperidyl dichlor sulfophosphine
    and substantially two molecular proportions of so-
    dium mercaptobenzothiazole.
```

The rubber mix after vulcanization by heating in a press, for different periods of time, exhibited the modulus and tensile characteristics indicated in Table III.

Table III

| Cure | | Modulus of elasticity in lbs/in² at elongations of | | | Tensile at break in lbs/in² | Ultimate elongation % |
|---|---|---|---|---|---|---|
| Time Mins. | Steam pressure lbs. | 300% | 500% | 700% | | |
| 30 | 20 | 96 | 187 | 527 | 2220 | 980 |
| 45 | 20 | 138 | 247 | 805 | 2890 | 930 |
| 60 | 20 | 147 | 294 | 995 | 3025 | 905 |
| 90 | 20 | 178 | 379 | 1160 | 3290 | 890 |

The accelerator described above was also employed in conjunction with a basic organic nitrogen-containing accelerator as an activator thereof and with it forming a mixed accelerator. Thus the following rubber stock was compounded:

- 100 parts of pale crepe rubber,
- 5 parts of zinc oxide,
- 3 parts of sulfur,
- 0.6 part of diphenylguanidine,
- 0.4 part of the reaction product of substantially one molecular proportion of piperidyl dichlor sulfophosphine and substantially two molecular proportions of sodium mercaptobenzothiazole.

The rubber stock was then vulcanized by heating in a press in the usual manner. The results of the tests on the cured rubber product are given in Table IV.

Table IV

| Cure | | Modulus of elasticity in lbs/in² at elongations of | | | Tensile at break in lbs/in² | Ultimate elongation % |
|---|---|---|---|---|---|---|
| Time Mins. | Steam pressure lbs. | 300% | 500% | 700% | | |
| 20 | 10 | 134 | 239 | 849 | 2060 | 860 |
| 30 | 10 | 154 | 350 | 1350 | 3160 | 850 |
| 30 | 20 | 250 | 669 | 2790 | 4460 | 790 |
| 45 | 20 | 277 | 814 | 3425 | 4600 | 755 |
| 60 | 20 | 326 | 1018 | 4050 | 4700 | 740 |
| 90 | 20 | 367 | 1140 | 4380 | 4700 | 730 |

The data set forth in Table IV show that the accelerator employed is particularly valuable, when employed in conjunction with a basic organic nitrogen-containing accelerator, for example, diphenylguanidine, in that high modulus and tensile values are realized without a tendency to overcure on prolonging the vulcanization period.

Another example of the preferred class of accelerators, for example the reaction product of dipiperidyl chlor phosphine and mercaptobenzothiazole was prepared by reacting substantially four molecular proportions of piperidine with substantially one molecular proportion of phosphorus trichloride and further reacting the dipiperidyl chlor phosphine thus formed with substantially one molecular proportion of the sodium salt of mercaptobenzothiazole in a manner analogous to that described above for the preparation of the reaction product of piperidyl dichlor phosphine and sodium mercaptobenzothiazole.

It is believed that the preparation of this product is represented by the following chemical equations:

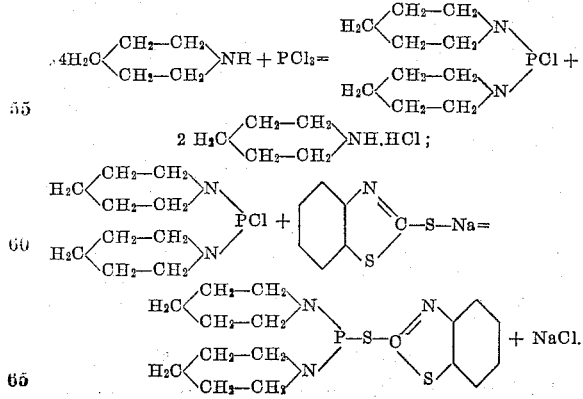

The product thus obtained was likewise incorporated in the usual manner in a rubber stock comprising

- 100 parts of pale crepe rubber,
- 5 parts of zinc oxide,
- 3 parts of sulfur,
- 1 part of the reaction product of substantially one molecular proportion of dipiperidyl chlor phosphine and substantially one molecular proportion of sodium mercaptobenzothiazole.

After vulcanizing the stock thus compounded the cured rubber product was found to possess the tensile and modulus characteristics set forth in Table V.

Table V

| Cure | | Modulus of elasticity in lbs/in² at elongations of | | | Tensile at break in lbs/in² | Ultimate elongation % |
|---|---|---|---|---|---|---|
| Time Mins. | Steam pressure lbs. | 300% | 500% | 700% | | |
| 20 | 10 | 296 | 885 | 3870 | 4550 | 740 |
| 30 | 10 | 360 | 1090 | 4520 | 5500 | 760 |
| 30 | 20 | 478 | 1718 | --------- | 4610 | 650 |

The above results show that a very strong ultra accelerator has been provided by the present invention.

The reaction product of dipiperidyl phosphine and sodium mercaptobenzothiazole was also employed in conjunction with diphenylguanidine, thus forming a mixed accelerator.

Another example of the preferred class of accelerators was prepared by reacting substantially four molecular proportions of piperidine with substantially one molecular proportion of phosphorus sulfochloride, and further reacting the dipiperidyl chlor sulfophosphine thus formed with substantially one molecular proportion of the sodium salt of mercaptobenzothiazole in a manner analogous to that described above for the preparation of the reaction product of piperidyl dichlor phosphine and sodium mercaptobenzothiazole.

It is believed that the preparation of this new compound is represented by the following equations:

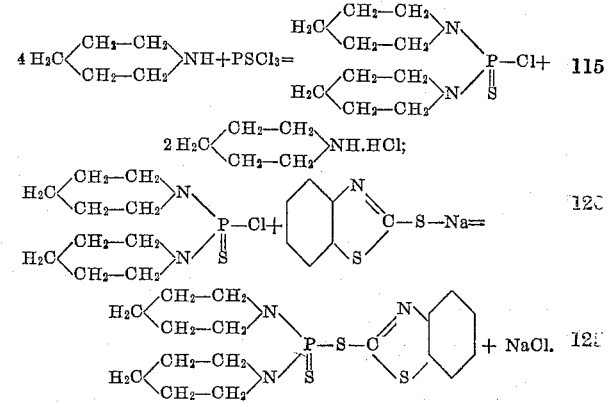

The reaction product prepared as described was compounded in a rubber stock comprising 100 parts of pale crepe rubber,
5 parts of zinc oxide,
3 parts of sulfur,
1 part of the reaction product of substantially one molecular proportion of dipiperidyl chlor sulfophosphine and substantially one molecular proportion of sodium mercaptobenzothiazole.

After vulcanizing the above rubber stock in the usual manner, a cured rubber product having the following physical properties was obtained:

Table VI

| Cure | | Modulus of elasticity in lbs/in² at elongations of | | | Tensile at break in lbs/in² | Ultimate elongation % |
|---|---|---|---|---|---|---|
| Time Mins. | Steam pressure lbs. | 300% | 500% | 700% | | |
| 20 | 10 | 234 | 657 | 2735 | 4780 | 810 |
| 30 | 10 | 266 | 774 | 3280 | 5030 | 780 |
| 30 | 20 | 398 | 1268 | 4820 | 5915 | 750 |
| 45 | 20 | 410 | 1423 | 5300 | 5550 | 740 |
| 90 | 20 | 492 | 2043 | -------- | 5265 | 675 |

The above data show that the reaction product of dipiperidyl chlor sulfophosphine and sodium mercaptobenzothiazole also possesses valuable accelerating properties when employed in the rubber vulcanization process.

Another example of the preferred class of compounds was prepared as follows: Substantially two molecular proportions of aniline and substantially one molecular proportion of phosphorus sulfochloride were heated together at a refluxing temperature for approximately one to two hours. The dianilino-chlor sulfophosphine thus formed, comprising a brittle resin, was heated with substantially one molecular proportion of potassium ethyl xanthate in the presence of a suitable solvent, for example, ethyl alcohol, at approximately 40 to 45° C. until reaction was completed. The precipitated salt was filtered off and the product isolated from the filtrate by any convenient means, preferably by evaporating on a steam bath. The dried product was a yellow powder.

It is believed that the formation of this product may be represented by the following chemical equations:

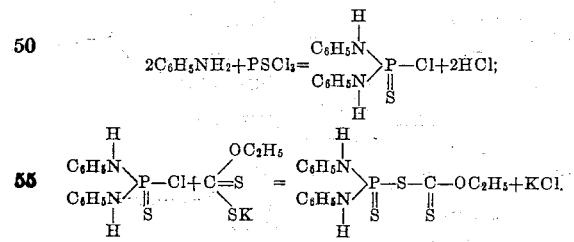

The material thus prepared has also been employed in a rubber stock as a vulcanization accelerator and found to exert an accelerating effect.

From the data hereinbefore set forth it is conclusively shown that the new class of materials comprise a group of vulcanization accelerators that are particularly desirable.

In like manner, other amino chlor phosphines than those described above may be reacted with compounds possessing the mercaptan grouping to form further examples of the preferred class of compounds. Thus, ortho toluino dichlor oxyphosphine, beta naphthylamino dichlor phosphine, diphenylamino tetrachlor phosphine, and the like are within the invention described and may be reacted with ethyl mercaptan, mercaptobenzothiazole, sodium amyl xanthate, sodium butyl xanthate, thiophenol, and the like, and the products formed employed as rubber vulcanization accelerators.

The present invention is limited only as defined in the following claims, in which it is intended to claim all novelty inherent in the invention as broadly as is permissible in view of the prior art.

What is claimed is:

1. The process of vulcanizing rubber which comprises heating rubber and sulfur in the presence of an accelerator comprising a reaction product of an amino chlor phosphine and an organic compound containing the grouping $-SR$, where R represents hydrogen, an alkali metal or a salt-forming group.

2. The process of vulcanizing rubber which comprises heating rubber and sulfur in the presence of an accelerator comprising a reaction product of a chlor phosphine in which one or more hydrogen atoms are replaced by an amine radical containing not less than five nor more than six carbon atoms and an organic compound containing the grouping $-SR$, where R represents hydrogen, an alkali metal or a salt-forming group.

3. The process of vulcanizing rubber which comprises heating rubber and sulfur in the presence of an accelerator comprising a reaction product of a chlor phosphine in which one or more hydrogen atoms are replaced by a secondary amine radical and an organic compound containing the grouping $-SR$, where R represents hydrogen, an alkali metal or a salt-forming group.

4. The process of vulcanizing rubber which comprises heating rubber and sulfur in the presence of an accelerator comprising a reaction product of a piperidyl substituted chlor phosphine and a mercaptothiazole.

5. The process of vulcanizing rubber which comprises heating rubber and sulfur in the presence of an accelerator comprising a reaction product of a piperidyl substituted chlor phosphine and a mercaptoarylthiazole.

6. The process of vulcanizing rubber which comprises heating rubber and sulfur in the presence of an accelerator comprising a reaction product of a piperidyl substituted chlor phosphine and a mercaptobenzothiazole.

7. The process of vulcanizing rubber which comprises heating rubber and sulfur in the presence of an accelerator comprising a reaction product of piperidyl dichlor phosphine and a mercaptobenzothiazole.

8. The process of vulcanizing rubber which comprises heating rubber and sulfur in the presence of an accelerator comprising a material formed by reacting substantially one molecular proportion of piperidyl dichlor phosphine with substantially two molecular proportions of the sodium salt of mercaptobenzothiazole.

9. The vulcanized rubber produced by heating rubber and sulfur in the presence of an accelerator comprising a reaction product of an amino chlor phosphine and an organic compound containing the grouping —SR, where R represents hydrogen, an alkali metal or a salt-forming group.

10. The vulcanized rubber produced by heating rubber and sulfur in the presence of an accelerator comprising a reaction product of a chlor phosphine in which one or more hydrogen atoms are replaced by an amine radical containing not less than five nor more than six carbon atoms and an organic compound containing the grouping —SR, where R represents hydrogen, an alkali metal or a salt-forming group.

11. The vulcanized rubber produced by heating rubber and sulfur in the presence of an accelerator comprising a reaction product of a chlor phosphine in which one or more hydrogen atoms are replaced by a secondary amine radical and a compound containing the grouping —SR, where R represents hydrogen, an alkali metal or a salt-forming group.

12. The vulcanized rubber produced by heating rubber and sulfur in the presence of an accelerator comprising a reaction product of a piperidyl substituted chlor phosphine and a mercaptothiazole.

13. The vulcanized rubber produced by heating rubber and sulfur in the presence of an accelerator comprising a reaction product of a piperidyl substituted chlor phosphine and a mercaptoarylthiazole.

14. The vulcanized rubber produced by heating rubber and sulfur in the presence of an accelerator comprising a reaction product of a piperidyl substituted chlor phosphine and a mercaptobenzothiazole.

15. The vulcanized rubber produced by heating rubber and sulfur in the presence of an accelerator comprising a reaction product of piperidyl dichlor phosphine and a mercaptobenzothiazole.

16. The vulcanized rubber produced by heating rubber and sulfur in the presence of an accelerator comprising a material formed by reacting substantially one molecular proportion of piperidyl dichlor phosphine with substantially two molecular proportions of the sodium salt of mercaptobenzothiazole.

17. The process of vulcanizing rubber which comprises heating rubber and sulfur in the presence of an accelerator comprising a reaction product of a piperidyl substituted chlor phosphine and a mercaptobenzothiazole, activated by a guanidine.

18. The process of vulcanizing rubber which comprises heating rubber and sulfur in the presence of an accelerator comprising a reaction product of piperidyl dichlor phosphine and a mercaptobenzothiazole, activated by diphenylguanidine.

19. The process of vulcanizing rubber which comprises heating rubber and sulfur in the presence of an accelerator comprising the reaction product of substantially one molecular proportion of piperidyl dichlor phosphine and substantially two molecular proportions of the sodium salt of mercaptobenzothiazole, activated by diphenylguanidine.

20. The vulcanized rubber produced by heating rubber and sulfur in the presence of an accelerator comprising a reaction product of a piperidyl substituted chlor phosphine and a mercaptobenzothiazole, activated by a guanidine.

21. The vulcanized rubber produced by heating rubber and sulfur in the presence of an accelerator comprising a reaction product of piperidyl dichlor phosphine and a mercaptobenzothiazole, activated by diphenylguanidine.

22. The vulcanized rubber produced by heating rubber and sulfur in the presence of an accelerator comprising the reaction product of substantially one molecular proportion of piperidyl dichlor phosphine and substantially two molecular proportions of the sodium salt of mercaptobenzothiazole, activated by diphenylguanidine.

In testimony whereof I hereunto affix my signature.

GEORGE L. MAGOUN.